(12) United States Patent
Shen et al.

(10) Patent No.: US 9,031,143 B2
(45) Date of Patent: May 12, 2015

(54) ADAPTIVE DECODING BASED ON SIGNAL TO NOISE RATIO (SNR)

(71) Applicant: Broadcom Corporation, Irvine, CA (US)

(72) Inventors: Ba-Zhong Shen, Irvine, CA (US); Richard S. Prodan, Niwot, CO (US); Avi Kliger, Ramat Gan (IL); Leo Montreuil, Atlanta, GA (US); Jonathan S. Min, Newport Coast, CA (US); Tak K. Lee, Irvine, CA (US); Kelly Brian Cameron, Irvine, CA (US); Hau Thien Tran, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/069,258

(22) Filed: Oct. 31, 2013

(65) Prior Publication Data

US 2014/0153673 A1 Jun. 5, 2014

Related U.S. Application Data

(60) Provisional application No. 61/732,901, filed on Dec. 3, 2012, provisional application No. 61/812,785, filed on Apr. 17, 2013, provisional application No. 61/886,346, filed on Oct. 3, 2013.

(51) Int. Cl.
| | |
|---|---|
| *H04L 1/00* | (2006.01) |
| *H04L 25/03* | (2006.01) |
| *H04L 25/06* | (2006.01) |
| *H04L 27/26* | (2006.01) |

(52) U.S. Cl.
CPC ........ *H04L 1/0054* (2013.01); *H04L 25/03318* (2013.01); *H04L 25/067* (2013.01); *H04L 27/2649* (2013.01)

(58) Field of Classification Search
CPC .............. H04L 1/0054; H04L 27/2649; H04L 25/03318; H04L 25/067
USPC .................. 375/227, 260, 262, 320, 340, 341
See application file for complete search history.

(56) References Cited

U.S. PATENT DOCUMENTS

| | | | | |
|---|---|---|---|---|
| 6,986,096 | B2 * | 1/2006 | Chaudhuri et al. | 714/780 |
| 7,813,453 | B2 * | 10/2010 | Khandekar et al. | 375/340 |
| 8,190,962 | B1 * | 5/2012 | Chen et al. | 714/752 |
| 8,286,048 | B1 * | 10/2012 | Chen et al. | 714/752 |

\* cited by examiner

*Primary Examiner* — Leon Flores
(74) *Attorney, Agent, or Firm* — Garlick & Markison; Shayne X. Short

(57) ABSTRACT

A communication device is configured adaptively to process a receive signal based on noise that may have adversely affected the signal during transition via communication channel. The device may be configured to identify those portions of the signal of the signal that are noise-affected (e.g., noise-affected sub-carriers of an orthogonal frequency division multiplexing (OFDM) signal), or the device may receive information that identifies those portions of the signal that are noise-affected from one or more other devices. The device may be configured to perform the modulation processing of the received signal to generate log-likelihood ratios (LLRs) for use in decoding the signal. Those LLRs associated with noise-affected portions of the signal are handled differently than LLRs associated with portions of the signal that are not noise-affected. The LLRs may be scaled based on signal to noise ratio(s) (SNR(s)) associated with the signal (e.g., based on background noise, burst noise, etc.).

20 Claims, 9 Drawing Sheets

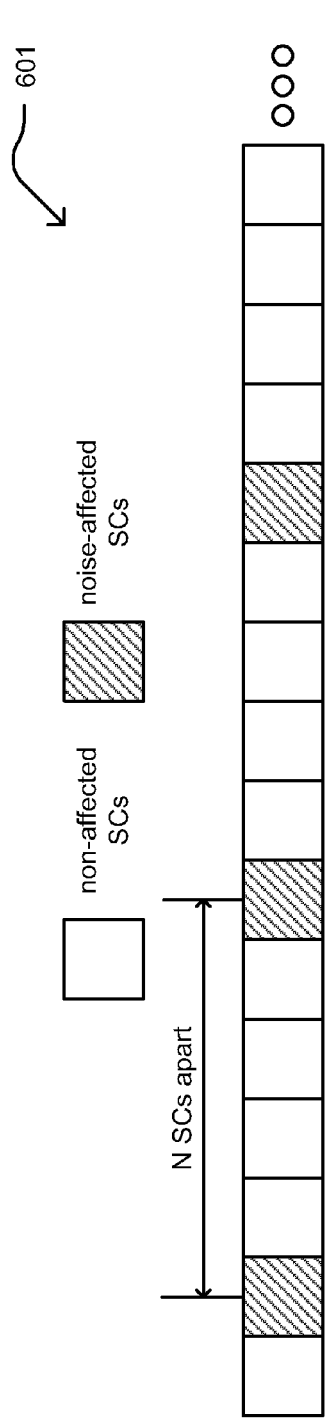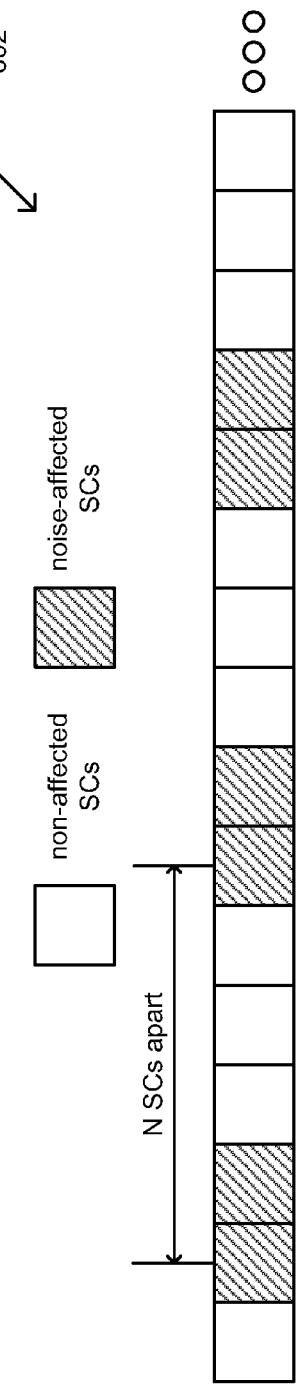

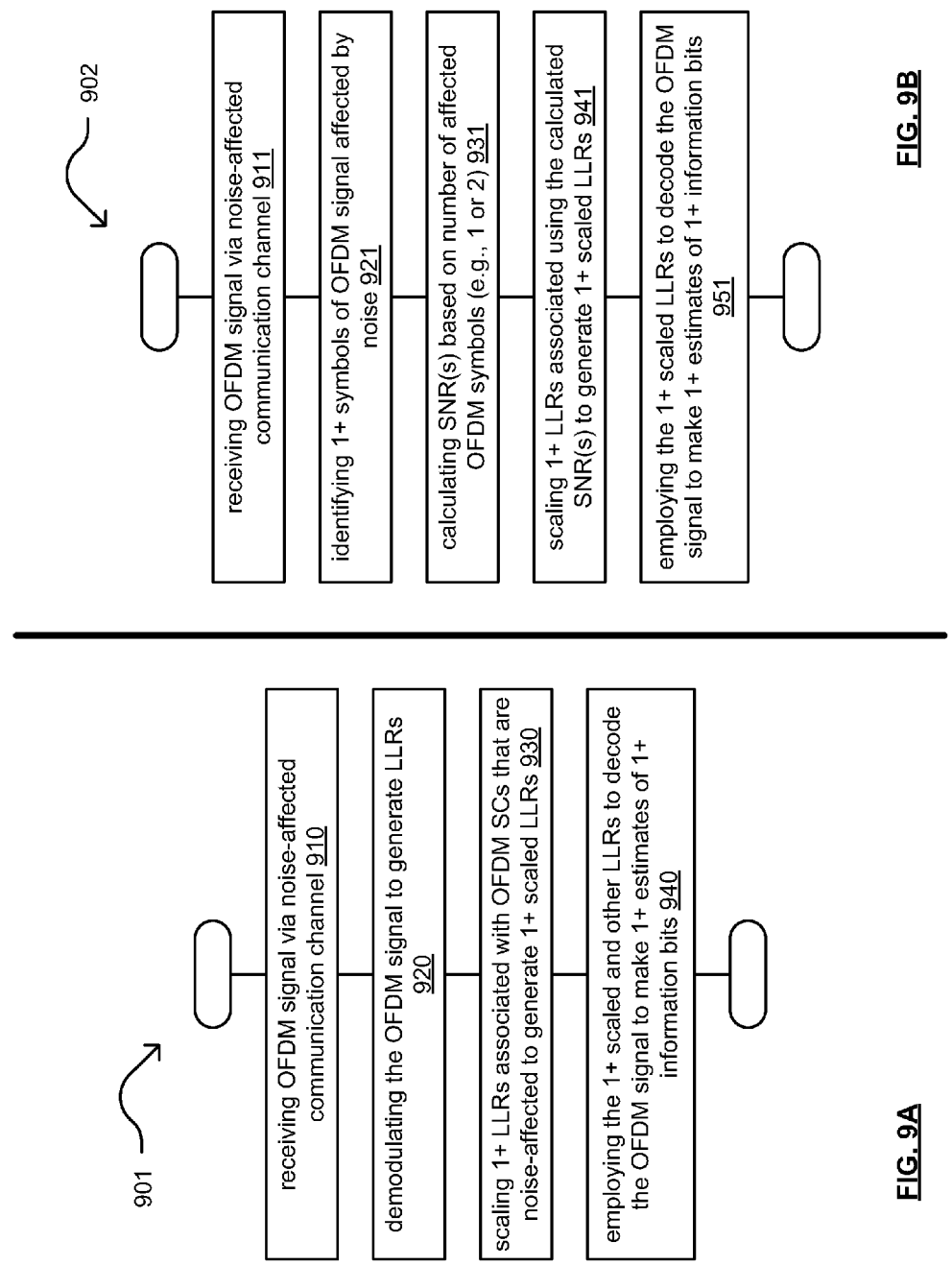

ADAPTIVE DECODING BASED ON SIGNAL TO NOISE RATIO (SNR)

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Patent Application Ser. No. 61/732,901, entitled "All bit coded low density parity check (LDPC) forward error correction (FEC)," filed Dec. 3, 2012.

2. U.S. Provisional Patent Application Ser. No. 61/812,785, entitled "All bit coded low density parity check (LDPC) forward error correction (FEC)," filed Apr. 17, 2013.

3. U.S. Provisional Patent Application Ser. No. 61/886,346, entitled "Adaptive decoding based on signal to noise ratio (SNR)," filed Oct. 3, 2013.

BACKGROUND

1. Technical Field

The present disclosure relates generally to communication systems; and, more particularly, to decoding of signals within such communication systems.

2. Description of Related Art

Data communication systems have been under continual development for many years. The primary goal within such communication systems is to transmit information successfully between devices. Unfortunately, many things can deleteriously affect signals transmitted within such systems resulting in degradation of or even complete failure of communication. Examples of such adverse effects include interference and noise that may be caused by a variety of sources including other communications, low-quality communication links, degraded or corrupted interfaces and connectors, etc.

Present technologies address some but certainly not all of the deficiencies that can exist and adversely affect communications within such communication systems. There continues to be much room for improvement related to identifying and mitigating the adverse effects that occur within communications to improve the performance of communication systems. As such adverse effects may be effectively reduced or even eliminated, a greater amount of information may be successfully transmitted between devices within a given time

BRIEF DESCRIPTION OF THE SEVERAL VIEWS OF THE DRAWINGS

FIG. 6A is a diagram illustrating an example of an interleaved signal having noise-affected sub-carriers (SCs).

FIG. 6B is a diagram illustrating another example of an interleaved signal having noise-affected sub-carriers (SCs).

FIG. 9A is a diagram illustrating an embodiment of a method for execution by one or more communication devices.

FIG. 9B is a diagram illustrating another embodiment of a method for execution by one or more communication devices.

DETAILED DESCRIPTION

Figure 1:
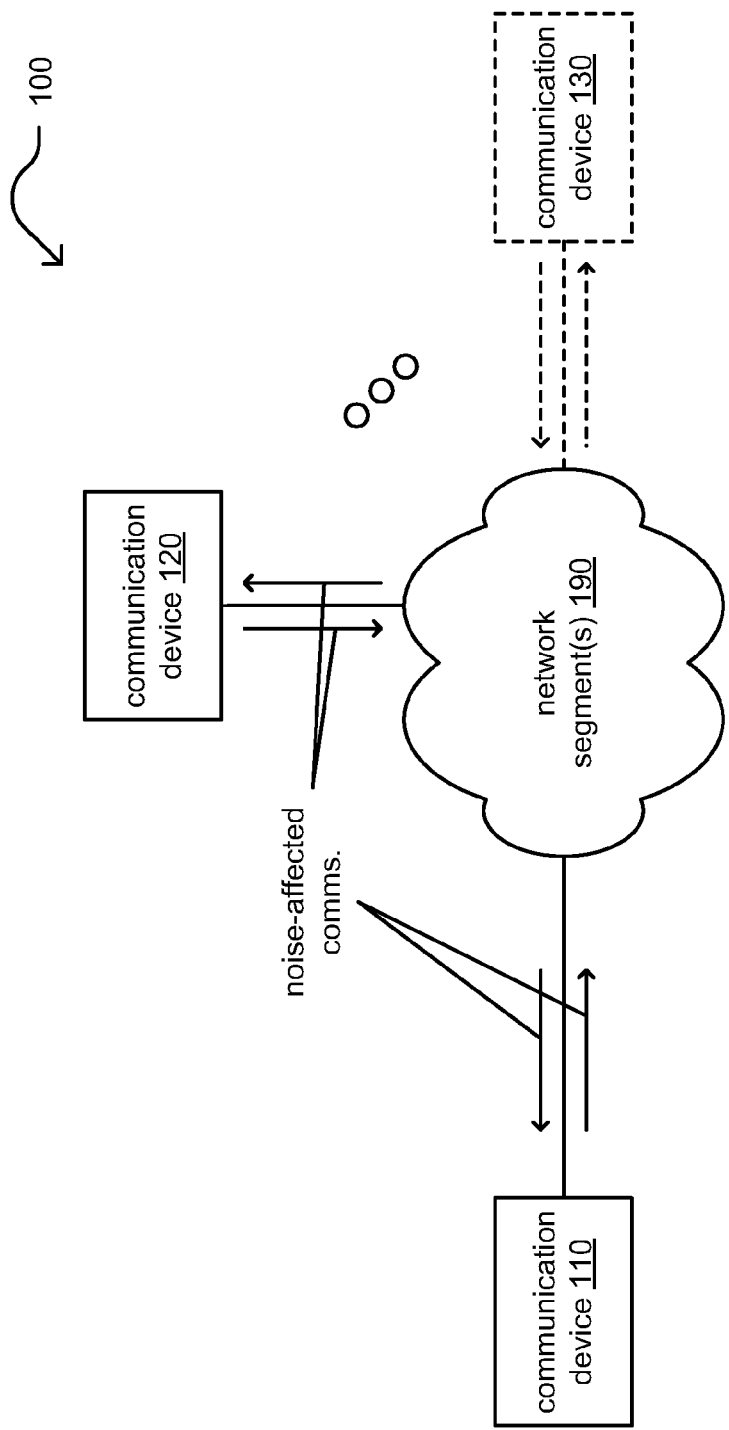
FIG. 1 is a diagram illustrating an embodiment of one or more communication systems.

FIG. 1 is a diagram illustrating an embodiment 100 of one or more communication systems. One or more network segments 190 provide communication inter-connectivity for at least two communication devices 110 and 120. Examples of network segments 190 can include any one or more of a local area network (LAN), a wide area network (WAN), a wireless local area network (WLAN), a public switched telephone network (PSTN), the Internet, a cellular communication network, etc. Generally speaking, any desired number of communication devices are included within one or more communication systems (e.g., as shown by communication device 130). Some or all the various communication devices 110-130 include capability to operate using forward error correction (FEC) and/or error correction code (ECC) as described herein.

The various communication infrastructure within the one or more network segments 190 may be implemented using any of a variety of communication media including communication links implemented as wireless, wired, optical, satellite, microwave, etc. communication links. Also, in some instances, communication links of different types may cooperatively form a connection pathway between any two communication devices. Considering one possible example, a communication pathway between devices 110 and 120 may include some segments of wired communication links and other segments of optical communication links. Note also that the devices 110-130 may be of a variety of types of devices including stationary devices, mobile devices, portable devices, etc. and may support communications for any of a number of services or service flows including data, telephony, television, Internet, media, synchronization, etc. Some of the devices 110-130 may be user devices (e.g., cellular phones, laptop computers, etc.), and some other of the devices 110-130 may be infrastructure based devices (e.g., access points (APs) in WLANs, cable modem termination system (CMTS) in cable based systems, etc.).

In an example of operation, device 110 includes a communication interface to support communications with one or more of the other devices 120-130. This communication may be bidirectional/to and from the one or more of the other devices 120-130 or unidirectional (or primarily unidirectional) from the one or more of the other devices 120-130. When device 110 is in communication with device 120, one or more the communication links between devices 110 and 120 may be adversely affected by one or more noise sources (e.g., background noise, burst noise, impulse noise, additive white Gaussian noise (AWGN), etc.). Communications adversely affected by noise may experience a reduction in signal to noise ratio (SNR). When the SNR falls below a certain level, a device receiving such communications may have difficulty or inability to process the communications properly to recover information therein. Also, when the SNR falls below a certain level, there may be instances estimates of the information therein includes one or more errors. When device 110 receives a signal that has been adversely noise-affected, device 110 can adaptively process that signal to mitigate or eliminate the effect of the noise. When the signal is based on orthogonal frequency division multiplexing (OFDM), there may be only certain sub-carriers that are affected by such noise. When these sub-carriers identified, the device 110 can adaptively handle processing of those sub-carriers differently than those which are not noise-affected.

When device 110 performs decoding of the signal, such as when the signal is forward error correction (FEC) and/or error correction code (ECC) encoded, the device 110 may calculate log-likelihood ratios (LLRs) for use in generating one or more estimates of one or more bits encoded within the signal. The LLRs associated with noise-affected sub-carriers may be scaled based on a SNR of the noise-affected sub-carriers, an SNR of the sub-carriers that are not noise-affected, or some scaling factor that is a ratio of these SNRs. The device 110 then employs any LLRs that have been appropriately scaled as well as those LLRs that did not need to be scaled (e.g., not associated with noise-affected sub-carriers) to perform decoding of the signal to generate estimates of the one or more bits encoded within the signal.

Figure 2:
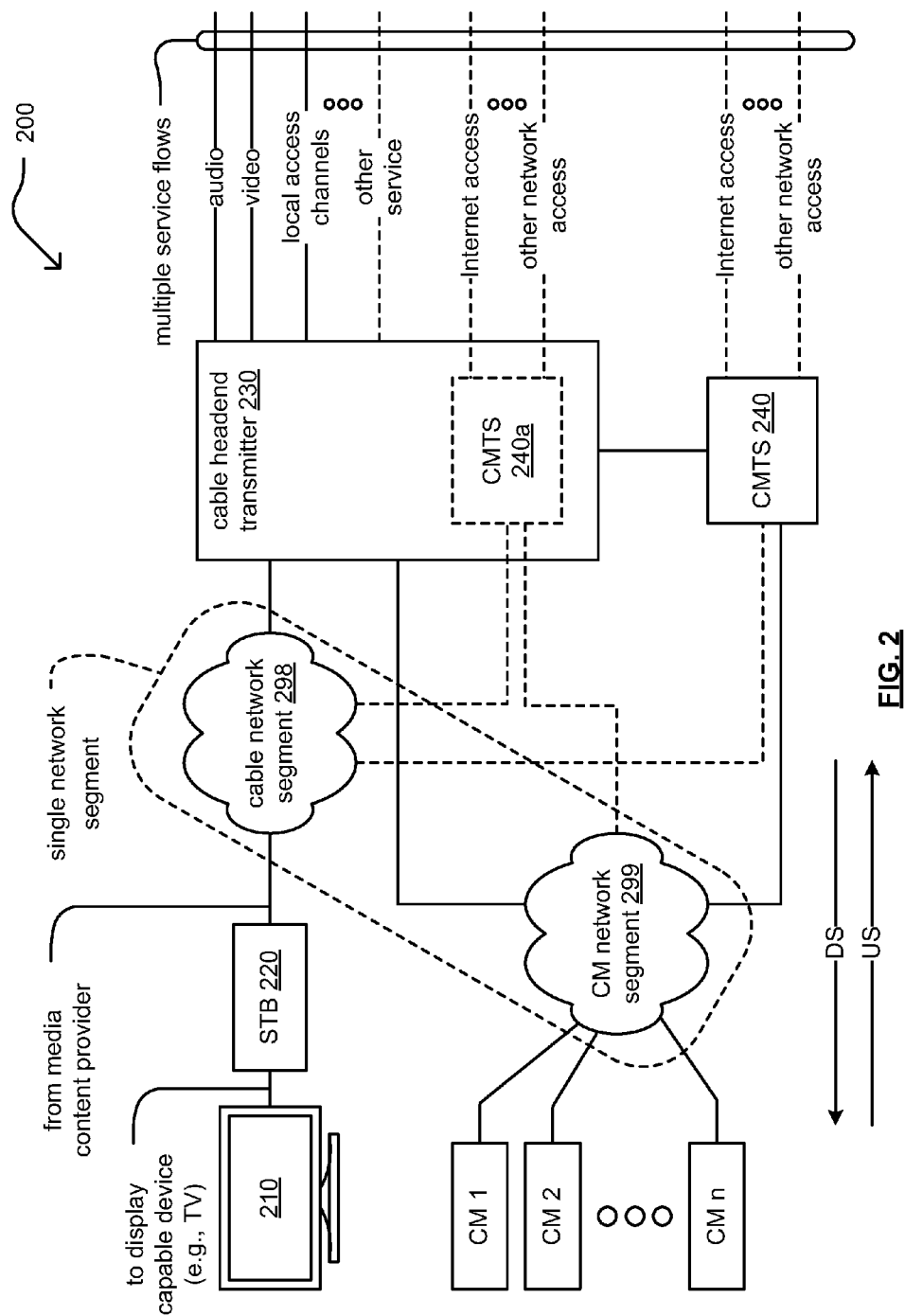
FIG. 2 is a diagram illustrating an example cable based communication system of the embodiment of the one or more communication systems in FIG. 1.

FIG. 2 is a diagram illustrating an example 200 cable based communication system of the embodiment 100 of the one or more communication systems in FIG. 1. A cable headend transmitter 230 provides service to a set-top box (STB) 220 via cable network segment 298. The STB 220 provides output to a display capable device 210. The cable headend transmitter 230 can support any of a number of service flows such as audio, video, local access channels, as well as any other service of cable systems. For example, the cable headend transmitter 230 can provide media (e.g., video and/or audio) to the display capable device.

The cable headend transmitter 230 may provide operation of a cable modem termination system (CMTS) 240*a*. For example, the cable headend transmitter 230 may perform such CMTS functionality, or a CMTS may be implemented separately from the cable headend transmitter 230 (e.g., as shown by reference numeral 240). The CMTS 240 can provide network service (e.g., Internet, other network access, etc.) to any number of cable modems (shown as CM 1, CM 2, and up to CM n) via a cable modem (CM) network segment 299. The cable network segment 298 and the CM network segment 299 may be part of a common network or common networks. The cable modem network segment 299 couples the cable modems 1-*n* to the CMTS (shown as 240 or 240*a*). Such a cable system (e.g., cable network segment 298 and/or CM network segment 299) may generally be referred to as a cable plant and may be implemented, at least in part, as a hybrid fiber-coaxial (HFC) network (e.g., including various wired and/or optical fiber communication segments, light sources, light or photo detection complements, etc.).

A CMTS 240 (or 240*a*) is a component that exchanges digital signals with cable modems 1-*n* on the cable modem network segment 299. Each of the cable modems is coupled to the cable modem network segment 299, and a number of elements may be included within the cable modem network segment 299. For example, routers, splitters, couplers, relays, and amplifiers may be contained within the cable modem network segment 299. Generally speaking, downstream information may be viewed as that which flows from the CMTS 240 to the connected cable modems (e.g., CM 1, CM 2, etc.), and upstream information as that which flows from the cable modems to the CMTS 240.

At least some of the devices within this diagram are implemented to perform the receive processing of signals received from other of the devices. For example, CMTS 240 (or 240*a*) may transmit a signal to one of the cable modems (CM 1). The cable modem can include a communication interface configured to receive that signal, which may be transmitted using OFDM. The cable modem can include a processor configured to process that signal to generate log-likelihood ratios (LLRs) for use in decoding the signal to make one or more estimates of one or more information bits encoded within the signal. Based on noise-affected sub-carriers within the signal, the processor may be configured to scale one or more of the LLRs. This scaling may be a function of a first SNR associated with the noise-affected sub-carriers, a second SNR associated with the sub-carriers that are not noise-affected, or some scaling factor that is a ratio of both the first and second SNRs.

Figure 3:
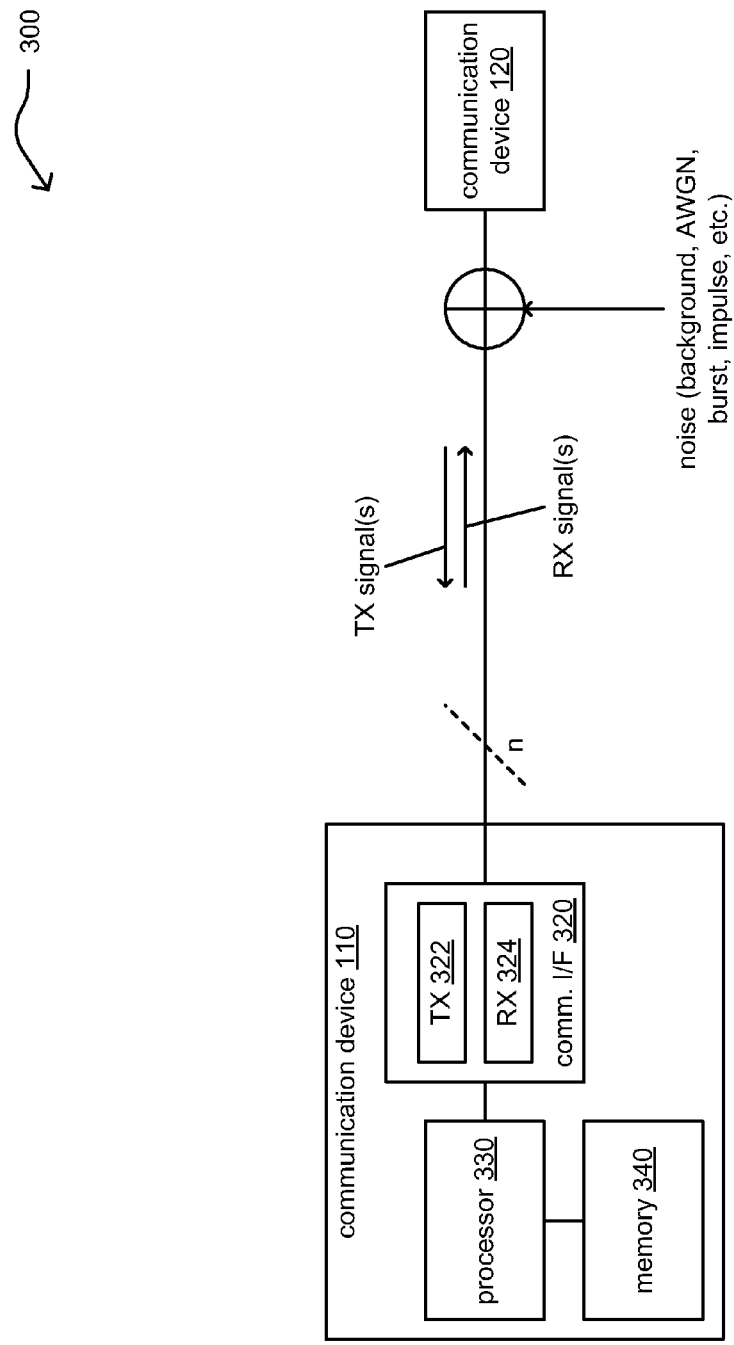
FIG. 3 is a diagram illustrating at least one communication device operative within one or more communication systems.

FIG. 3 is a diagram 300 illustrating at least one communication device 110 operative within one or more communication systems. The device 110 includes a communication interface 320 and a processor 330. The communication interface 320 includes functionality of a transmitter 322 and the receiver 324 to support communications with one or more other devices within a communication system (e.g., communication device 120). The device 110 may also include memory 340 to store information including LLRs generated by the device 110 or other information received from other devices via one or more communication channels. Memory 340 may also include and store various operational instructions for use by the processor 330 in regards to calculating LLRs, scaling LLRs, decoding signals, etc. as described herein. Memory 340 may also include and store information related to various SNRs that may be calculated and used to perform scaling of LLRs as described herein.

The communication interface 320 is configured to support communications to and from one or more other devices (e.g., communication device 120). When a signal is transmitted between devices 110 and 120, any number of noise sources may adversely affect that signal. Such noise may be caused by any one or more of background noise, burst noise, impulse noise, additive white Gaussian noise (AWGN), etc. In an OFDM based communication system, there may be certain types of noise whose locations in frequency may be identified. When these frequency locations are identified, the sub-carriers associated with those frequency locations may be handled differently than sub-carriers associated with frequencies that are not noise-affected. For example, communication interface 320 may be configured to receive an OFDM signal from device 120 via the noise-affected communication channel. Processor 330 may be configured to process that received signal to generate LLRs for use in decoding the signal to make one or more estimates of one or more information bits encoded within the signal. Note that any number of different types of forward error correction (FEC) and/or error correction code (ECC) may operate using, at least in part, LLRs. Some examples of FEC and/or ECC that may be employed include convolutional, turbo, low density parity check (LDPC), turbo trellis coded modulation (TTCM), Reed-Solomon (RS), BCH (Bose and Ray-Chaudhuri, and Hocquenghem), etc. based codes (and/or any combination thereof).

Processor 330 may be configured to scale one or more of the LLRs that correspond to one or more frequencies that are noise-affected. Certain of the frequencies may be unaffected by any noise sources, and the LLR is associated with those frequencies may be handled differently than the LLR is associated with frequencies that are noise-affected. Processor 330 may then employ the one or more scaled LLRs and other LLRs to decode the signal to generate one or more estimates of one or more information bits encoded within the signal.

Figure 4:
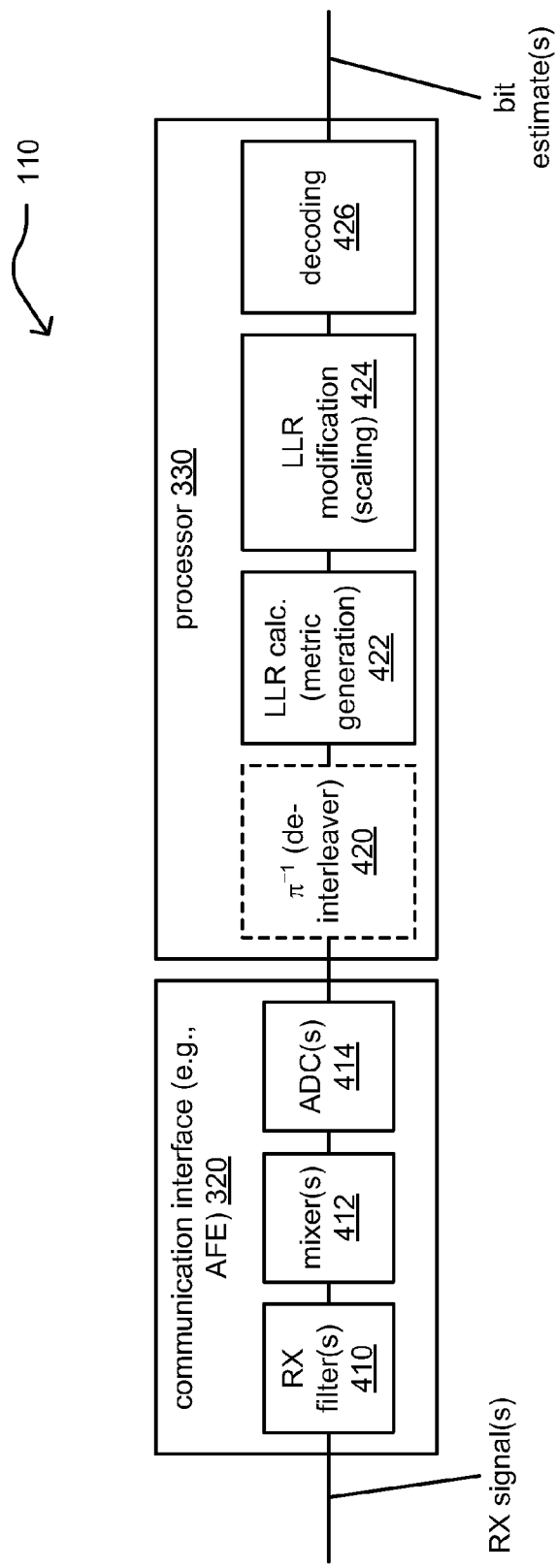
FIG. 4 is a diagram illustrating another example of a communication device.

FIG. 4 is a diagram illustrating another example of a communication device 110. Device 110 includes communication interface 320 and processor 330. Communication interface 320 may perform those operations typically associated with an analog front end (AFE) of a communication device (e.g., analog-to-digital conversion such as using an analog to digital converter (ADC), gain adjustment or scaling, frequency conversion such as down-conversion, filtering, etc.). In this example, communication interface 320 is shown as including one or more receive filters 410, one or more mixers 412 configured to perform frequency conversion, one or more ADCs 414 to perform digital sampling. Generally, the communication interface 320 is configured to perform processing of a continuous-time signal from a communication channel to generate a digital signal, such as a baseband signal, that may undergo subsequent processing by processor 330.

Processor 330 includes capability to perform LLR calculation 422 (e.g., such as by a metric generator), LLR modification (such as scaling) 424, and decoding 426 (based on any one or more desired ECCs and/or FECs). In some examples, processor 330 also includes a de-interleaver ($\pi^{-1}$) 420. When a de-interleaver 420 is employed, identification of noise-affected portions of the received signal may be relatively easier. After decoding 426, processor 330 generates one or more estimates of one or more information bits encoded within the received signal.

Processor 330 is configured to handle the LLRs adaptively based on noise that has adversely affected the received signal. For example, there may be instances in which the noise affects only one or more sub-carriers of an OFDM signal. When that information is known, the LLRs associated with those sub-carriers that are noise-affected may be handled differently than the LLRs associated with those sub-carriers that are not noise-affected. Generally, the LLRs associated with sub-carriers that are noise-affected and the LLRs associated with sub-carriers that are not noise-affected are handled differently. The processor 330 may be configured to scale one or more of the LLR is based on the noise-affected sub-carriers. This scaling may be a function of a first SNR associated with the noise-affected sub-carriers, a second SNR associated with the sub-carriers that are not noise-affected, or some scaling factor that is a ratio of both the first and second SNRs.

Also, there may be instances in which a received signal will have undergone the addition of one or more field bits, shortening, puncturing, etc. within the transmitter device that generates that signal. In such instances, processor 330 may be configured to add one or more field bits to a demodulated signal to generate a de-shortened signal. These one or more field bits may be based on a combined encoding in shortening use by the transmitter device when generating the signal. Then, after accommodating any such operations that may have been performed within the transmitter device, the processor 330 may be configured to perform decoding of the de-shortened signal to make one or more estimates of one or more information bits encoded within the signal.

Figure 5:
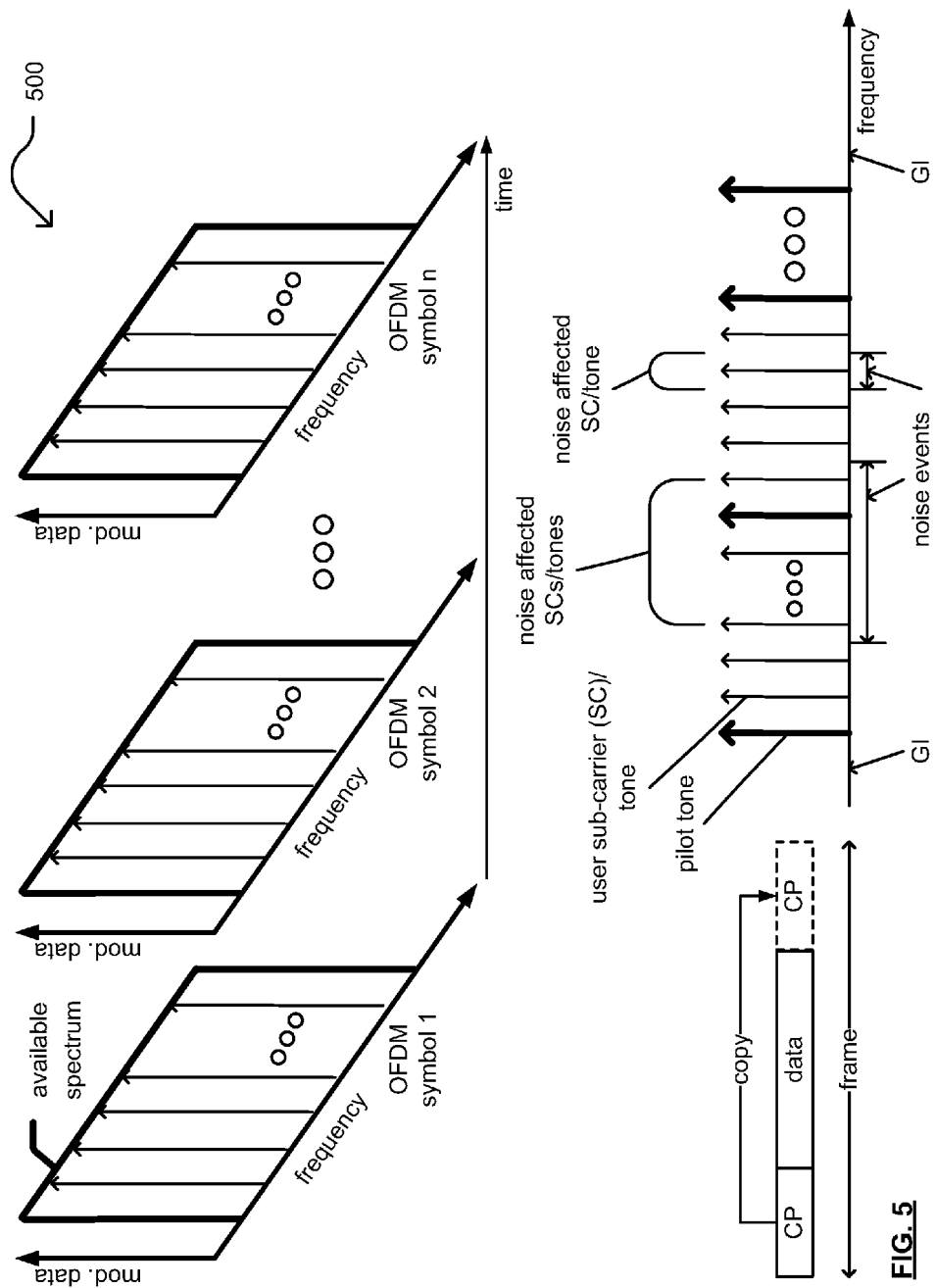
FIG. 5 is a diagram illustrating an example of orthogonal frequency division multiplexing (OFDM).

FIG. 5 is a diagram illustrating an example 500 of orthogonal frequency division multiplexing (OFDM). OFDM modulation may be viewed a dividing up an available spectrum into a plurality of narrowband sub-carriers (e.g., lower data rate carriers). Typically, the frequency responses of these sub-carriers are overlapping and orthogonal. Each sub-carrier may be modulated using any of a variety of modulation and/or coding techniques. Some examples of modulations include 256 quadrature amplitude modulation (QAM), 512 QAM, 1024 QAM, 2048 QAM, or 4096 QAM. Also, other modulations such as binary phase shift keying (BPSK), quadrature phase shift keying (QPSK)/4-QAM, 8-PSK, 23 amplitude phase shift keying (APSK), etc. may alternatively be used or in conjunction with such modulations as well.

OFDM modulation may operate by performing simultaneous transmission of a large number of narrowband carriers (or multi-tones). An OFDM symbol may include pilot tones for use in channel estimation characterization and information-carrying tones that carry information to be transmitted from one device to another. Information-free tones may be included within an OFDM symbol to perform interference cancellation. A guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. Note that an OFDMA frame may include more than one OFDM symbol. In addition, a CP (Cyclic Prefix) may also be employed within the guard interval to allow switching time, such as when jumping to a new communication channel or sub-channel, and to help maintain orthogonality of the OFDM symbols. Generally speaking, an OFDM system design is based on the expected delay spread within the communication system (e.g., the expected delay spread of the communication channel).

Certain types of noise may affect only one or more of the sub-carriers of one or more OFDM symbols. For example, considering the lower right-hand portion of the diagram, one or more noise events may affect as few as one sub-carrier or more than one sub-carrier. Certain types of noise events, such as impulse or burst noise events may affect adjacently located sub-carriers. There may be some instances in which noise-affected sub-carriers are not all contiguously located, in that, there is at least one intervening sub-carrier that is not noise-affected between at least two noise-affected sub-carriers. A communication device may be configured adaptively to process the sub-carriers differently based on how they are adversely affected by noise. For example, a communication device may calculate LLRs based on modulated data included within the various sub-carriers. Those LLRs associated with noise-affected sub-carriers may be handled differently than LLR is associated with sub-carriers that are not adversely affected by noise. The device may then employ all of the LLRs, including those that have been handled differently than others, to generate one or more estimates of one or more information bits encoded within the signal.

FIG. 6A is a diagram illustrating an example 601 of an interleaved signal having noise-affected sub-carriers (SCs). Interleaving and de-interleaving may be performed within communication systems. For example, a transmitter device may interleave signal before transmission of the signal via a communication channel to a receiver device. The receiver device may then de-interleave the received signal based on the interleaver pattern employed by the transmitter device. When such interleaving related operations are performed within an OFDM based communication system, identification of those sub-carriers that are noise-affected may be relatively easier. For example, if a burst or impulse noise event affects a number of adjacently located sub-carriers during a signal transmission via communication channel, then after de-interleaving of that signal, those noise-affected sub-carriers will be separated based on one or more interleaver parameters (e.g., interleaver pattern, type of interleaving, interleaver depth, etc.).

This diagram shows a case in which one OFDM symbol is adversely affected by noise based on an interleaver depth of N. When one OFDM symbol is impacted, those noise-affected sub-carriers will be located N sub-carriers apart. Those noise-affected sub-carriers of the noise-affected OFDM symbol will be interspersed among non-affected sub-carriers by a number of sub-carriers that corresponds to the interleaver depth, N.

FIG. 6B is a diagram illustrating another example 602 of an interleaved signal having noise-affected sub-carriers (SCs). This diagram shows a case in which two consecutive OFDM symbols are adversely affected by noise based on an interleaver depth of N. When to OFDM symbols are impacted, there will be two noise-affected sub-carriers adjacently located within the de-interleave signal, and they will be spaced apart again by the interleaver depth, N, as shown in the diagram. As can be seen, interleaving and de-interleaving within a communication system can assist in the identification of those sub-carriers that may be noise-affected.

Note, however, that while interleaving and de-interleaving is shown as one example that may assist in the identification of noise-affected sub-carriers, any of a number of different means may be used to identify those sub-carriers that are adversely affected by noise. Also, certain devices may be implemented not to perform the identification of noise-affected sub-carriers, but to receive such information from one or more other devices within the system. As an example, a first device may receive information regarding which sub-carriers are noise-affected from a second device, and the first device may use that received information to process LLRs adaptively to generate one or more scaled LLRs for use in decoding a signal.

Figure 7A:
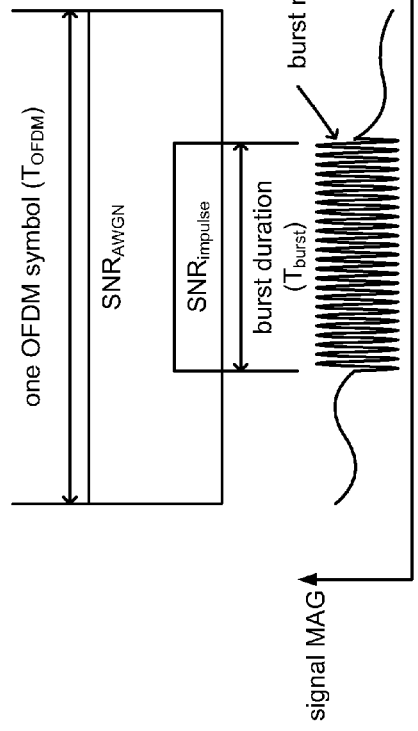
FIG. 7A is a diagram illustrating an example of signal to noise ratio (SNR) calculation.

FIG. 7A is a diagram illustrating an example 701 of signal to noise ratio (SNR) calculation. This diagram shows an example in which SNR may be calculated when a noise event adversely affects one OFDM symbol. A burst noise event may occur for a particular duration of time adversely affecting an OFDM symbol. During this period, the ratio of the signal (e.g., signal magnitude (MAG)) to the noise (e.g., SNR) may degrade to a point that a communication device may have difficulty or inability to process those adversely affected portions of the signal to recover information within the OFDM symbol. In some instances, all additive white Gaussian noise (AWGN) may affect all portion of a signal, and there may be a portion of the signal that is also affected by a burst noise event. The burst noise event can be localized in frequency such that it occurs in certain portions of the frequency spectrum and affects some sub-carriers more than others. The SNR of these burst noise event affected sub-carriers may be reduced to a point that information in the OFDM symbol may not be able to be recovered properly. Note also that some sub-carriers located outside of those portions of the frequency spectrum of the burst noise event may be unaffected by the burst noise event.

In the diagram, the duration of the one OFDM symbol is shown as $T_{OFDM}$, the noise event or burst duration is shown as $T_{burst}$, the SNR due to additive white Gaussian noise (AWGN) is shown as $SNR_{AWGN}$, and the impulse SNR is shown as $SNR_{impulse}$.

In such an example, the SNR experienced by all sub-carriers in the OFDM symbol due to burst noise only may be calculated as follows:

$$SNR_{burst} = SNR_{impulse} - 10 \log(T_{burst}/T_{OFDM})$$

$T_{OFDM}$: OFDM symbol duration without cyclic prefix
$T_{CP}$ duration of cyclic prefix
$T_{burst}$: burst duration
$SNR_{impulse}$: impulse SNR The SNR experienced by all sub-carriers in the one OFDM symbol due to background noise only may be calculated as follows:

$$SNR_{background} = SNR_{AWGN} - 10 \log(1 - [T_{burst}/T_{OFDM}])$$

Figure 7B:
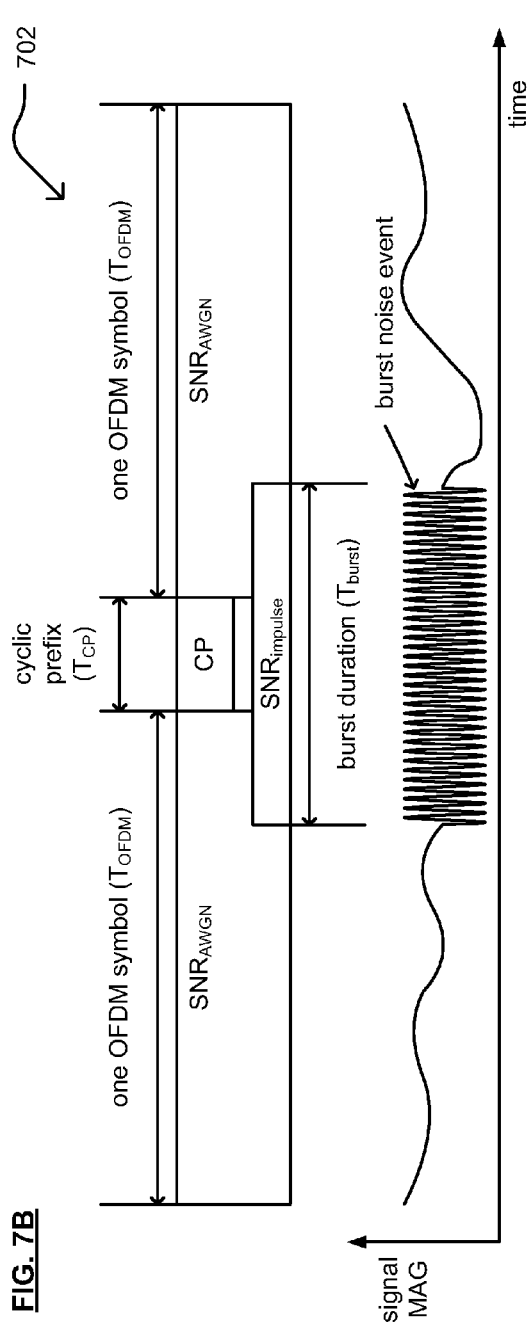
FIG. 7B is a diagram illustrating another example of signal to noise ratio (SNR) calculation.

FIG. 7B is a diagram illustrating another example 702 of signal to noise ratio (SNR) calculation. This diagram shows an example in which SNR may be calculated when a noise event adversely affects two consecutive OFDM symbols. The duration of the one OFDM symbol is shown as $T_{OFDM}$, the noise event or burst duration is shown as Tburst, the SNR due to additive white Gaussian noise (AWGN) is shown as SNRAWGN, and the impulse SNR is shown as SNRimpulse, and the duration of cyclic prefix is shown as TCP.

In such an example, the SNR experienced by all sub-carriers in two OFDM symbols due to burst noise only may be calculated as follows:

In such an example, the SNR experienced by all sub-carriers in two OFDM symbols due to burst noise only may be calculated as follows:

$$SNR_{burst} = SNR_{impulse} - 10 \log(0.5*(T_{burst} - T_{CP})/T_{OFDM})$$

$T_{OFDM}$: OFDM symbol duration without cyclic prefix
$T_{CP}$ duration of cyclic prefix
$T_{burst}$: burst duration
$SNR_{impulse}$: impulse SNR The SNR experienced by all sub-carriers in the two OFDM symbols due to background noise only may be calculated as follows:

$$SNR_{background} = SNR_{AWGN} - 10 \log(1 - [0.5*(T_{burst} - T_{CP})/T_{OFDM}])$$

The SNR on the burst noise impacted subcarrier in the presence of background AWGN may be calculated as follows:

$$SNR_{sub-carrier} = -10 \ Log(10^{[-SNR_{burst}/10]} + 10^{[-SNR_{background}/10]})$$

$SNR_{sub-carrier}$: SNR experienced by all sub-carriers in the OFDM symbol
$SNR_{background}$: Background (thermal) Additive White Gaussian noise contribution
$SNR_{burst}$: impulse SNR contribution Generally, the LLRs associated with sub-carriers that are noise-affected and the LLRs associated with sub-carriers that are not noise-affected are handled differently. The processor 330 may be configured to scale one or more of the LLR is based on the noise-affected sub-carriers. This scaling may be a function of a first SNR associated with the noise-affected sub-carriers, a second SNR associated with the sub-carriers that are not noise-affected, or some scaling factor that is a ratio of both the first and second SNRs.

In an example of operation, depending on whether one or two OFDM symbols is affected by noise, the appropriately selected (e.g., one or two OFDM symbols been affected) $SNR_{burst}$ may be used to scale LLRs of those sub-carriers that are noise-affected, and the appropriately selected (e.g., one or two OFDM symbols been affected) $SNR_{background}$ may be used to scale LLRs of those sub-carriers that are not noise-affected. In this example, LLRs of those sub-carriers that are noise-affected will be scaled by only $SNR_{burst}$, while LLRs of those sub-carriers that are not noise-affected will be scaled by only $SNR_{background}$.

In another example operation, the appropriately selected (e.g., one or two OFDM symbols been affected) $SNR_{background}$ may be used to scale the LLRs of all of the sub-carriers, and then the $SNR_{burst}$ may be used to scale LLRs of those sub-carriers that are noise-affected. In this example, LLRs of those sub-carriers that are noise-affected will be scaled by both $SNR_{background}$ and $SNR_{burst}$, while LLRs of those sub-carriers that are not noise-affected will be scaled by only $SNR_{background}$. This example of operation may be viewed as a type of normalization based on the background noise.

In yet another example of operation, those LLRs of those sub-carriers that are noise-affected may be scaled by $SNR_{sub-carrier}$, while the LLRs of those sub-carriers that are not noise-affected are not scaled.

Figure 8:
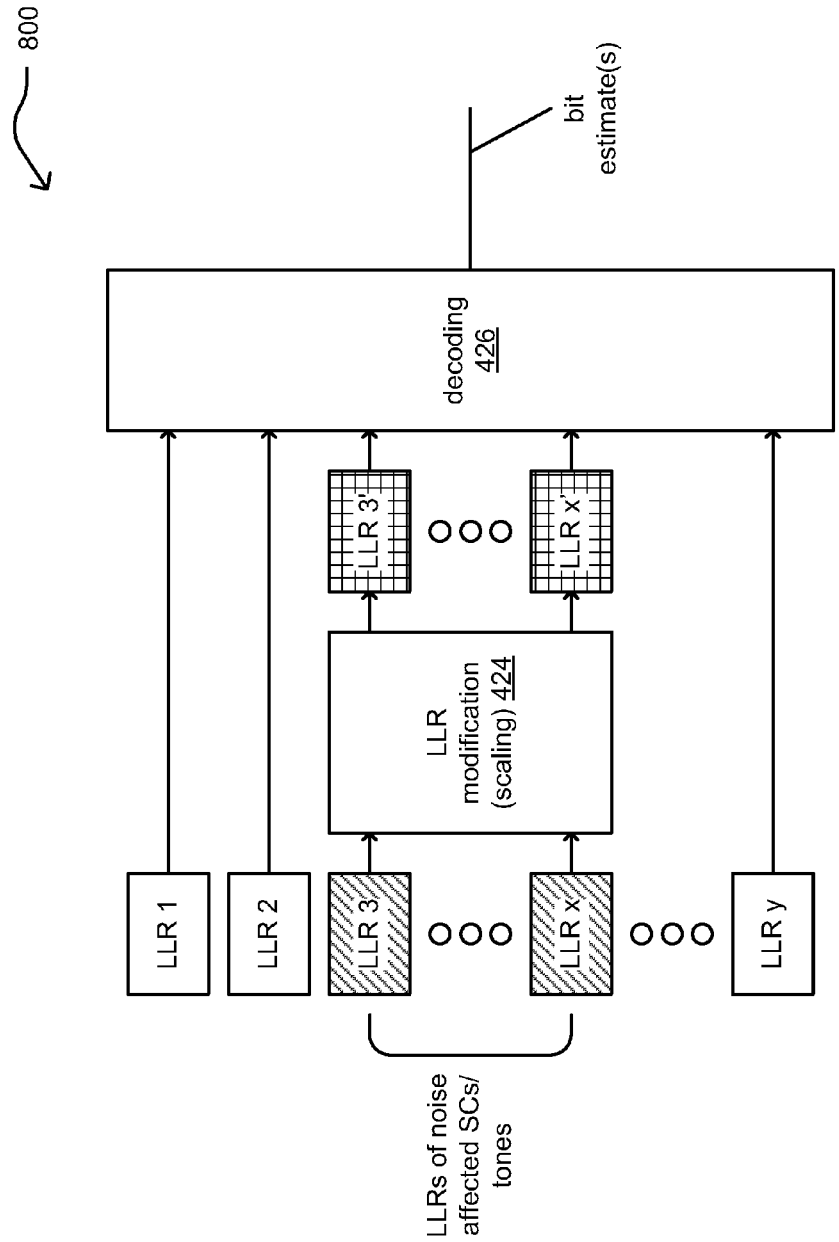
FIG. 8 is a diagram illustrating an example of log-likelihood ratio (LLR) modification based on noise-affected sub-carriers (SCs).

FIG. 8 is a diagram illustrating an example 800 of log-likelihood ratio (LLR) modification based on noise-affected sub-carriers (SCs). A device processes the signal to calculate a number of LLRs. The device then modifies those LLRs associated with noise-affected sub-carriers. An LLR modification block 424 is shown to modify those LLRs that are associated with noise-affected sub-carriers. For example, LLR 3 through LLR x are shown as being modified, such as scaled, by the LLR modification block 424 to generate LLR 3' through LLR x'. The modification may be based on scaling using any one or more of the SNRs described herein.

The device and performs decoding 426 using those LLRs that have undergone modification and those LLRs that have not to generate one or more estimates of one or more information bits included within the signal.

FIG. 9A is a diagram illustrating an embodiment of a method 901 for execution by one or more communication devices. The method 901 operates by receiving an OFDM signal via a noise-affected communication channel (block 910). The method 901 continues by demodulating the OFDM signal the generate LLRs (block 920). Such demodulation operations may be associated with those typically performed by a communication interface of a communication device (e.g., an analog front end (AFE) of the communication device) to generate a digital signal, such as a baseband signal, and metric generation, such as performed by a processor of the communication device, to generate the LLRs.

The method 901 continues by scaling one or more LLR is associated with those OFDM sub-carriers that are noise-affected to generate one or more scaled LLRs (block 930). The method 901 then operates by employing the one or more scaled LLRs and the other LLRs to decode the OFDM signal to make one or more estimates of one or more information bits encoded within the left him signal (block 940).

FIG. 9B is a diagram illustrating another embodiment of a method 902 for execution by one or more communication devices. The method 902 operates by receiving an OFDM signal via a noise-affected communication channel (block 911). The method 902 continues by identifying one or more symbols of the OFDM signal their affected by noise (block 921).

Based on a number of noise-affected OFDM symbols (e.g., one symbol, two symbols, etc.), the method 902 continues by calculating one or more SNRs (block 931). Examples of such SNR's may be related to background, burst, sub-carrier, etc. as described herein. The method 902 then operates by scaling one or more LLR is associated with noise-affected sub-carriers using one or more of the calculated SNRs to generate one or more scaled LLRs. The method 902 then operates by employing the one or more scaled LLR is to decode the OFDM signal to make one or more estimates of one or more information bits encoded therein (block 951).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, micro-computer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/ or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
    a communication interface configured to receive from another communication device a signal that is formatted in accordance with orthogonal frequency division multiplexing (OFDM); and
    a processor configured to:
        process the signal to generate a plurality of log-likelihood ratios (LLRs);
        deinterleave the signal based on a predetermined interleaver depth to generate a deinterleaved signal;
        identify one or more OFDM sub-carriers affected by burst noise based on relative magnitudes of OFDM sub-carriers within the deinterleaved signal;
        scale one or more LLRs of the plurality of LLRs associated with one or more OFDM sub-carriers that are adversely affected by noise using a background noise based signal to noise ratio (SNR) and a burst noise based SNR to generate one or more scaled LLRs; and
        decode the signal or the deinterleaved signal using the one or more scaled LLRs and any LLRs of the plurality LLRs associated with one or more OFDM sub-carriers that is unaffected by the noise to make one or more estimates of one or more information bits within that signal that are transmitted via the one or more OFDM sub-carriers that are adversely affected by the noise.

2. The communication device of claim 1 further comprising:
    the processor configured to:
        determine a duration of a burst noise event and one or more OFDM symbols of the signal affected by the burst noise event;
        calculate the burst noise based SNR using a first ratio of the duration of the burst noise event to a duration of one OFDM symbol when one OFDM symbol of the signal is affected by the burst noise event; and
        calculate the burst noise based SNR using a second ratio of a difference of the duration of the burst noise event and a duration of an OFDM cyclic prefix (CP) to a duration of one OFDM symbol when two OFDM symbols of the signal are affected by the burst noise event.

3. The communication device of claim 1 further comprising:
    the processor configured to scale the one or more LLRs of the plurality of LLRs associated with the one or more OFDM sub-carriers affected by the burst noise using another SNR that is a function of the background noise based SNR and the burst noise based SNR.

4. The communication device of claim 1 further comprising:
    the processor configured to perform low density parity check (LDPC) decoding of the signal using the one or more scaled LLRs to make one or more estimates of one or more information bits encoded within the signal, wherein the signal is an LDPC encoded signal.

5. The communication device of claim 1 further comprising:
a cable headend transmitter or a cable modem termination system (CMTS); and
the communication interface configured to receive the signal from a cable modem.

6. The communication device of claim 1 further comprising:
the processer configured to:
demodulate OFDM sub-carriers within the signal based on 256 quadrature amplitude modulation (QAM), 512 QAM, 1024 QAM, 2048 QAM, or 4096 QAM to generate a demodulated signal;
add one or more fill bits to the demodulated signal to generate a de-shortened signal, wherein the one or more fill bits are based on a combined encoding and shortening used by the another communication device to generate the signal; and
perform low density parity check (LDPC) decoding of the de-shortened signal to make one or more estimates of one or more information bits encoded within the signal, wherein the signal is an LDPC encoded signal.

7. The communication device of claim 1 further comprising:
a cable modem; and
the communication interface configured to receive the signal from a cable headend transmitter or a cable modem termination system (CMTS).

8. The communication device of claim 1 further comprising:
the communication interface configured to support communications within at least one of a satellite communication system, a wireless communication system, a wired communication system, a fiber-optic communication system, and or a mobile communication system.

9. A communication device comprising:
a communication interface configured to receive from another communication device a signal based on orthogonal frequency division multiplexing (OFDM) from a communication channel affected by noise; and
a processor configured to:
process the signal to generate a plurality of log-likelihood ratios (LLRs);
scale one or more LLRs of the plurality of LLRs associated with one or more OFDM sub-carriers that are affected by both background noise and burst noise using a first signal to noise ratio (SNR) to generate a first one or more scaled LLRs;
scale one or more LLRs of the plurality of LLRs associated with one or more OFDM sub-carriers that are unaffected by the burst noise using a second SNR that is based on the background noise to generate a second one or more scaled LLRs; and
decode the signal using the first and the second one or more scaled LLRs and any LLRs of the plurality LLRs associated with one or more OFDM sub-carriers that is unaffected by the noise to make one or more estimates of one or more information bits encoded within the signal.

10. The communication device of claim 9 further comprising:
the processor configured to:
calculate the first SNR using a third SNR that is based on a burst noise event that causes the burst noise and a duration of the burst noise event; and
calculate the second SNR using a fourth SNR that is based on additive white Gaussian noise (AWGN) of the communication channel and the duration of the burst noise event.

11. The communication device of claim 9 further comprising:
the processor configured to perform low density parity check (LDPC) decoding of the signal to make one or more estimates of the one or more estimates of one or more information bits encoded within the signal, wherein the signal is an LDPC encoded signal.

12. The communication device of claim 8 further comprising:
a cable modem, wherein the another communication device is a cable headend transmitter or a cable modem termination system (CMTS).

13. The communication device of claim 9 further comprising:
the communication interface configured to support communications within at least one of a satellite communication system, a wireless communication system, a wired communication system, a fiber-optic communication system, or a mobile communication system.

14. A method for execution by a communication device, the method comprising:
via a communication interface of the communication device, receiving from another communication device a signal that is formatted in accordance with orthogonal frequency division multiplexing (OFDM);
processing the signal to generate a plurality of log-likelihood ratios (LLRs);
deinterleaving the signal based on a predetermined interleaver depth to generate a deinterleaved signal;
identifying one or more OFDM sub-carriers affected by burst noise based on relative magnitudes of OFDM sub-carriers within the deinterleaved signal;
scaling one or more LLRs of the plurality of LLRs associated with one or more OFDM sub-carriers that are adversely affected by noise using a background noise based signal to noise ratio (SNR) and a second burst noise based SNR to generate one or more scaled LLRs; and
decoding the signal or the deinterleaved signal using the one or more scaled LLRs and any LLRs of the plurality LLRs associated with one or more OFDM sub-carriers that is unaffected by the noise to make one or more estimates of one or more information bits within that signal that are transmitted via the one or more OFDM sub-carriers that are adversely affected by the noise.

15. The method of claim 14 further comprising:
determining a duration of a burst noise event and one or more OFDM symbols of the signal affected by the burst noise event;
calculating the burst noise based SNR using a first ratio of the duration of the burst noise event to a duration of one OFDM symbol when one OFDM symbol of the signal is affected by the burst noise event; and
calculating the burst noise based SNR using a second ratio of a difference of the duration of the burst noise event and a duration of an OFDM cyclic prefix (CP) to a duration of one OFDM symbol when two OFDM symbols of the signal are affected by the burst noise event.

16. The method of claim 14 further comprising:
scaling the one or more LLRs of the plurality of LLRs associated with the one or more OFDM sub-carriers affected by the burst noise using another SNR that is a function of the background noise based SNR and the burst noise based SNR.

17. The method of claim 14 further comprising:

performing low density parity check (LDPC) decoding of the signal using the one or more scaled LLRs to make one or more estimates of one or more information bits encoded within the signal, wherein the signal is an LDPC encoded signal.

18. The method of claim 14 further comprising:

demodulating OFDM sub-carriers within the signal based on 256 quadrature amplitude modulation (QAM), 512 QAM, 1024 QAM, 2048 QAM, or 4096 QAM to generate a demodulated signal;

adding one or more fill bits to the demodulated signal to generate a de-shortened signal, wherein the one or more fill bits are based on a combined encoding and shortening used by the another communication device to generate the signal; and performing low density parity check (LDPC) decoding of the de-shortened signal to make one or more estimates of one or more information bits encoded within the signal, wherein the signal is an LDPC encoded signal.

19. The method of claim 14, wherein the communication device is a cable modem, and the another communication device is a cable headend transmitter or a cable modem termination system (CMTS).

20. The method of claim 14 further comprising:

operating the communication interface of the communication device to support communications within at least one of a satellite communication system, a wireless communication system, a wired communication system, a fiber-optic communication system, or a mobile communication system.

* * * * *